Patented Dec. 18, 1945

2,391,042

UNITED STATES PATENT OFFICE 2,391,042

PROCESS FOR THE PRODUCTION OF SOLID-IFYING THICKENED AND SOLID MASSES FROM ESTERS OF UNSATURATED FATTY ACIDS

Paul Stamberger, Dover, Del.

No Drawing. Application November 14, 1942,
Serial No. 465,636

4 Claims. (Cl. 106—252)

This invention relates to the production of solidifying thickened and solid masses from esters of long chain fatty acids by a process of oxidation.

It is well known that drying and semi-drying oils can be thickened and ultimately solidified by oxidation. This well known method consists in blowing the oil with an oxygen containing gas, such as air, whereby the thickening and solidifying takes place. These known processes are carried out usually at elevated temperature. Such an oxidation is a relatively slow process which can only be controlled with difficulties and requires considerable skill. It is believed that such an oxidation reaction takes place on the interface of the oil and the gas. The products of such an oxidation dissolve in the oil below such an interface which is still unchanged and form a colloidal solution. This process continues until all the oil is transformed in a mass containing large quantity of oxidized products. The velocity of such a reaction may be increased by enlarging the surface of the drying oil in contact with the oxygen. This may be carried out either by spreading the oil into a thin film or by dispersing the oil in a medium, for example by producing a dispersion or emulsion of the oil in water with small dispersed particles, the best particles are of one micron or less diameter, and by subjecting this dispersion to the action of oxygen or oxygen containing gas.

The present invention is based on the discovery that esters of polyvalent alcohols and unsaturated fatty acids are oxidized remarkably easy in the presence of hydrogen peroxide; furthermore, on the observation that for such unsaturated fatty acid esters hydrogen peroxide itself is in the presence of catalysts a very effective oxidizing agent. According to the present invention such a process is used to thicken and to solidify natural and modified fatty oils containing unsaturated fatty acids as well as synthetic products and to produce also sticky masses suitable as adhesives. It was found that when hydrogen peroxide is brought in contact with drying oils and similar products in the presence of suitable catalysts, the solidification of the oil will take place within a very short time throughout the whole mass, and it is not necessary to increase the surface of the oil to be oxidized to an extent which is comparable with the surface increase essential for oxidation with oxygen and oxygen containing gas, to produce a solid mass of few millimeters thickness within a short time.

For the process which is the object of the present invention, it is essential that a non-gaseous oxidizing agent, capable of being brought in solution, is used which decomposes without leaving a non-volatile residue, such as hydrogen peroxide and solutions of hydrogen peroxide and it is further an essential feature to use such amounts of the oxidizing agent that an approximate saturation, or complete saturation of the fatty acid esters with the oxygen without decomposition of the oil, is reached which is accompanied by a spontaneous solidification of the oil. It is further essential that the oxidation is carried out in the presence of catalysts, whereby it is enabled to carry out the oxidation reaction at low temperatures, even at room temperature, (that is about 10°–40° C.) and to such an extent that solid products are formed. In such a process the presence, nature and quantity of catalysts may serve not only to accelerate but also to influence otherwise the oxidation process. A product, the oxidation of which is carried out to such an extent as it is admissable without decomposition of the fatty acid esters, has different and advantageous properties compared with products obtained from fatty oils by the oxidation processes, in which the oxidation has not been carried out to the degree mentioned previously. In carrying out the process in the presence of catalysts it makes it possible to carry out and to influence the reaction in such a manner that a spontaneous and very rapid solidification of the fatty acid esters will take place. In using hydrogen peroxide as the oxidizing agent, the presence of the known metallic catalysts consisting of heavy metals has also a definite advantage, since these catalysts are activated by the hydrogen peroxide; therefore such catalysts will show far greater activity than with other oxidizing agents (for example, oxygen gas).

It is an advantage of the process that it can be used in a very simple and effective manner to carry out oxidation of dispersions and emulsions of drying oils or drying oil fatty acids containing substances, whereby the oxidation is very effective even in coarse dispersions with particle size of 6 microns and larger. With hydrogen peroxide the oxidation is completed in very short time and a dispersion of solid products can easily be obtained. No ions are added or formed by the decomposition of hydrogen peroxide, and its use has no adverse effect on the properties and stability of the emulsion.

The advantage of the process which is subject of the present invention may be proved by the following experiment: 50 grams of water and 50 grams of a hydrogen peroxide solution in water of 30 volume percent concentration are placed in two separate flasks. 20 grams of tung oil in which 0.3 gram of cobalt is dissolved are poured over each of these liquids. Within a few minutes a solid film formation can be observed in the flask containing hydrogen peroxide and in two hours time the whole oil is transferred into a solid dry mass. The reaction is accompanied by heat evolution but no formation of oxygen gas could be observed. In the other flask where the tung oil was placed over water only, a film formation could only be observed after 30 minutes and even after 24 hours the contents of the flask was only solid on the surface, showing there a sticky, soft mass. The thickness of both the tung oil layers was 10 millimeters.

This behavior of hydrogen peroxide is utilized in the present invention for the production of fast drying and for solid dry masses as well as for adhesives from esters of polyvalent alcohols and unsaturated long chain fatty acids, or in general with chemical compounds containing such unsaturated long chain fatty acids. The best method found to carry out this invention for transforming the fatty acid esters into products having the improved properties and into solid substances is by dispersing the fatty acid compounds in water by a process of emulsification and then by bringing the hydrogen peroxide in contact with the dispersed particles. According to the progress of this oxidation process, a viscous rapidly drying respectively solidifying or a solid dry mass and even adhesives will remain after evaporation of the water or after coagulation of the dispersion.

The application of hydrogen peroxide as an oxidizing agent, preferably in a concentrated solution, allows the reaction to be carried out in the emulsified state of the oil or similar products at room temperature.

To obtain solid products, it is necessary to use as starting material, such esters of unsaturated fatty acids which contain more than one double bond, such as linoleic acid esters. Such products can, however, be obtained by a previous treatment from materials which originally do not satisfy this requirement, such as castor oil. It is therefore of importance for the production of solid products, that the fatty oil ester which is to be oxidized will contain in any stage of the process, but before the emulsification, more than one double bond even when the composition of the oil and its unsaturation changes by previous treatment as heat bodying, or polymerization, which decreases the number of double bonds.

The oxidation catalysts are generally also catalysts for the known process of drying oils and are used in the manufacture of varnishes and lacquers. Such catalysts are cobalt, manganese, lead, zinc, iron, copper, respectively, their salts with organic and inorganic compounds. It is advantageous to use combinations of catalysts. These can be added either to the oil before it is dispersed or to the dispersion before or after the addition of the hydrogen peroxide. The properties of the product can be adjusted by varying the amount of hydrogen peroxide which, as a matter of fact, reacts quantitatively and gives up the free oxygen to the drying oils or compounds containing unsaturated fatty acids. The amount and nature of the oxidation catalyst has also a marked effect on the properties of the product formed.

If water dispersion of the unsaturated fatty acid compounds are to be produced, it is essential to carry out the process in a manner that the stability is not impaired during or after the reaction. To produce stable dispersions or emulsions it is advisable to use emulsifying agents which will keep the dispersion in a stable unchanged state after the oxidation process is completed. Dispersing agents of such nature must be used that the formation of oxidizing products of acidic nature and the change of the pH of the dispersion has no effect on the stability of the dispersion.

A solution of the above problem, which is part of the present invention was found by adding emulsifying, stabilizing or dispersing agents to the dispersion, which agents belong to the class of non-ionic and cation active substances. These can be added before, during or after the emulsion is made, separately or in combination with each other. Emulsifying agents belonging to the class of non-ionic substances are, for example, esters of long chain fatty acids as non-ethylenglycolmonooleate, higher fatty alcohols as dodecylalcohol, condensation products of polyethylenoxides. Emulsifying, stabilizing and dispersing agents belonging to the class of cation active substances are, for example, so-called reverted soaps, in which, contrary to anionic soaps, the long chain is attached to a positive group such as a quaternary ammonium; pyridinium groups, for example, cetylpyridiniumbromide or duodecylammonium bromide and similar substances.

It is furthermore necessary to work under conditions which permit no unreacted oxygen gas to escape from the reaction vessel, due to too rapid decomposition of the hydrogen peroxide. To avoid spontaneous decomposition of the hydrogen peroxide, it is advisable to keep the pH of the dispersion before the addition of the oxidizing agent within certain limits. The decomposition of hydrogen peroxide, if it takes place too suddenly, is accompanied with gas evolution which may be so rapid that it takes place on the surface of the dispersion before it could be mixed with the total quantity to be oxidized. This causes unwanted foaming and also affects the economy of the process. The invention is based on the discovery that the pH value of the dispersion has to be adjusted in a manner that the oxidation process will take place at a higher or at the same rate as the decomposition of the hydrogen peroxide. It was found that the limits are between pH 10 and pH 4. It was found that good results were obtained when the pH of the dispersion to which the hydrogen peroxide is added is kept about 8.5. If the pH is more on the alkaline side, too rapid decomposition of the hydrogen peroxide will take place and unreacted oxygen gas will escape, causing considerable foaming. If, on the other hand, the pH is far on the acidic side, the action of the hydrogen peroxide is slowed down to such an extent that the oxidation of the dispersed particles is negligible, even after several days, if the pH is low, for example, below 4. It has to be understood that the optimum hydrogen ion concentration will vary within the above limits, according to the rate of combination of drying oil with oxygen.

It is also possible to reduce the amount of oxidizing agent used with the dispersion of the oil by oxidizing the oil previous to the dispersion process, or by heat-bodying the oil. Such a process can be carried out by blowing the oil with oxygen containing gases and/or heating the oil at elevated temperature. The dispersion itself may also be subjected to a combined process in which the introduction of air or oxygen is combined with the action of hydrogen peroxide.

To modify the products manufactured, resins, gums or rosins can be dissolved in the oil or mixed esters of the unsaturated fatty acids with polybasic acids, such as phthalic or maleic acids; furthermore, phenolic resin modified oils and the like can be used. Inorganic pigments, dyes and fillers can be dispersed in the oil before emulsification or oxidation. Unsaturated fatty acids with conjugated double bonds, for example, tung oil, or oiticica oil, react more easily. Oils which have been blown or heat bodied can also be used with advantage. Blown oils require a less quantity of hydrogen peroxide and are more economic in their use, and, furthermore, less by-products of oxidation will form in the dispersion.

Esters of the above mentioned substances with tetrahydric alcohols, as pentaerythritol have definite advantages, i. e. they give harder and more water resistant products.

Solutions of the products to be subjected to the oxidation process or emulsions of such solutions can also be used.

*Example 1.*—400 parts of dehydrated castor oil was mixed with a solution of dryers as naphthenates, so the oil contained 0.3% Pb, 0.03% Co, and 0.02% Zn. To emulsify the oil the following emulsifying agents were added: 2 parts of a polyethyleneoxide condensation product with castor oil (a satisfactory product of this type being marketed by the General Dyestuff Corporation under the trade name of Emulphor ELA); 1 part of cetyl dimethyl benzyl ammonium chloride (which is marketed by the Rohm and Haas Company under the trade name of Triton K-60). 200 parts of water which was mixed up with 0.5 part of an aralkyl polyether alcohol condensation product, which is a non-ionic emulsifying agent (a satisfactory product of this type being marketed by the Rohm & Haas Company under the trade name of Triton NE), and 1 part of triethanolamin was stirred in the oil. The mixture was allowed to pass through a so-called colloid mill. The resulting mass was a dispersion of oil in water having rather high consistency. The pH of this dispersion was 8.7. To oxidize the product, 60 parts of a hydrogen peroxide solution of 30 vol. per cent active hydrogen peroxide content was mixed in slowly. The hydrogen peroxide was a stabilized commercial product, the pH of which was 6. Slight foaming was observed during the addition of the hydrogen peroxide and some heating effect. The pH of the mix after the total quantity of the $H_2O_2$ was mixed in was 6.5. 24 hours later all the $H_2O_2$ was combined with the oil and no surplus could be detected. The pH of such a mix was 4.7. After drying by evaporation of the water, a solid but soft film remained which became hard and solid by drying on the air (in a similar manner as drying oils behave when exposed to the oxidizing action of the air). By elevated temperature, this process took only 10 minutes. The temperature was 110° C. The dispersion remained unchanged for several months. After two weeks the pH was found to be 4.1.

*Example 2.*—400 parts of a dehydrated castor oil as above were blown with air at 180° C. for 3 hours. The dryers were added as 0.3% Pb, 0.03% Co and 0.03% Zn (calculated on the oil) and the temperature was reduced to 120° C. and the blowing with air continued for 1 more hour. To disperse the mix the temperature was reduced to 60° C. and 2 parts of a polyethyleneoxide condensation product with castor oil, as used in Example 1, 1 part of cetyl dimethyl benzyl ammonium chloride, as used in Example 1, and ¼ part of nonaethyleneglycolmonooleate were used. The water used for emulsification was 230 parts with 0.5 parts of hydroxyethylethylendiamin dissolved. The emulsification was carried out in the usual manner. The emulsion had a pH of 8.2. For oxidation to a solid oil, only 16 parts of $H_2O_2$ solution (as above) were necessary. The pH after addition of the $H_2O_2$ was 7.1. After 24 hours standing, this reduced to 6.8. The residue was a solid film having similar properties as the film obtained in Example 1.

*Example 3.*—A phenolic resin modified varnish made in the usual manner, by cooking 4 gallons of China-wood oil, 16 gallons of linseed oil and 100 lbs. of a paratertiary alkyl phenol formaldehyde condensation product type resin, said type also referred to in the literature as "pure phenolic resin" (a suitable product being marketed by the Stroock & Wittenberg Corporation under the trade name of Arofene 700) has been used. Driers were added which were calculated on the fatty oil constituents of the oil. The ultimate quantity of driers were 0.3% lead, 0.02% cobalt and 0.05% manganese. For emulsifying, for every 100 parts of the varnish 2 parts of a polyethyleneoxide condensation product with castor oil, as used in Example 1, 0.3 part of a polyethyleneoxide condensation product with oleyl alcohol (a satisfactory product of this type being marketed by the General Dyestuffs Corporation under the trade-name of Emulphor ON) and 0.5 part of triethanolamin were dissolved in the varnish itself. 50 parts water were used furthermore, in which 1 part of cetyl dimethyl benzyl ammonium chloride, as used in Example 1, and 0.2 part of alkyl dimethyl benzyl ammonium chloride, a quaternary ammonium salt (a suitable product being marketed by the General Dyestuff Corporation under the trade name of Zephiran) were dissolved. All the other ingredients are identical with those used in the previous examples. The parts are calculated on the varnish content of the dispersion. After the emulsification process, the pH of the dispersion was 8.2. For oxidation 100 parts of the 67% dispersion were slowly mixed with 16 parts of 30 vol. 5% hydrogen peroxide solution. After the reaction was completed, the pH of the dispersion was 7.5. After evaporation of the water at room temperature a solid, strong elastic film remained.

The above process can also be carried out by allowing to pass oxygen or an oxygen containing gas through the dispersion containing a suitable liquid oxidizing agent such as hydrogen peroxide, in the presence of an oxidation catalyst. Such a process can be advantageously carried out by applying the gas under pressure which is greater than the atmospheric. The oxygen containing gas and the liquid oxidizing agent, such as a solution of hydrogen peroxide in water, can be introduced simultaneously. The dispersion itself can also be kept under the same pressure as the oxidizing gas.

I claim:

1. A process for producing stable aqueous dispersions of thickened esters, which process comprises dispersing in water a polyhydric alcohol ester of a polyunsaturated long chain fatty acid, and subjecting the dispersed particles to oxidation with hydrogen peroxide in the presence of an oxidation promoting catalyst and in the presence of an agent selected from the class consisting of nonionic and cationic emulsifying and stabilizing agents, the dispersion during oxidation, having a pH value between about 4 and 10, and the oxidation being continued until the ester is appreciably thickened.

2. A process in accordance with claim 1 in which the pH value of the dispersion, during oxidation, is about 8.5.

3. A process in accordance with claim 1 in which the pH value of the dispersion, during oxidation, is from about 4 to about 8.5.

4. A process in accordance with claim 1 in which the oxidation is effected in the presence of at least one non-ionic agent and at least one cationic agent.

PAUL STAMBERGER.